Oct. 23, 1934.   P. MÜLLER   1,977,689

OPTICAL SYSTEM

Filed Sept. 23, 1929

Inventor:
PAUL MÜLLER
By Haseltine, Lake & Co.
Attorneys

Patented Oct. 23, 1934

1,977,689

UNITED STATES PATENT OFFICE 1,977,689

OPTICAL SYSTEM

Paul Müller, Berlin, Germany

Application September 23, 1929, Serial No. 394,445
In Germany September 25, 1928

2 Claims. (Cl. 177—329)

This invention relates to signal lamps, and more particularly to optical systems employed in conjunction therewith.

The primary object of the invention is to generally improve on systems of this kind, and to overcome various disadvantages more fully referred to in the following: In connection with light signals, and more particularly those employed for railroad traffic, optical arrangements are required which with the source of light available, which in the majority of cases is not very strong, utilize this light to the greatest possible extent in one particular direction. This is usually accomplished by the use of parabolic reflectors composed of metal, or other optical means in which the reflection is performed by metal discs. These are accompanied by the disadvantage that the degree of reflection is very poor, and may be still further diminished by oxidation or by other deposits or coatings on the surface. It has therefore also been attempted to substitute the metallic reflectors by other optical means. When employing simple dioptrical lenses, however, the utilization of the source of light is relatively poor owing to the small angle of light reception. The use of catadioptrical rings in place of the parabolic reflector has hitherto been prohibitive by reason of extremely complicated and expensive fitting in the lamp.

As stated above, it is the primary object of the invention to overcome these disadvantages. Other objects and advantages will become apparent as the description proceeds.

According to the invention the disadvantages in question are avoided by the use of only one lens and only one catadioptrical ring, the convex faces of which are so constructed that total reflection of the light takes place. It is thus possible to avoid the use of any kind of metallic reflecting surface, while it is nevertheless easily possible to encompass the source of light up to an angle of 180°.

The invention will now be described more fully with reference to the accompanying drawing, which shows the optical system in diagrammatical form.

Figure 1:
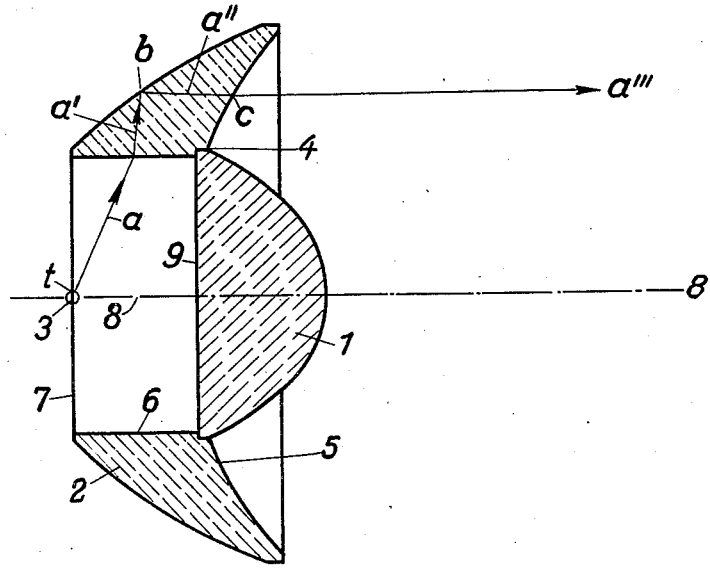
Figure 2:
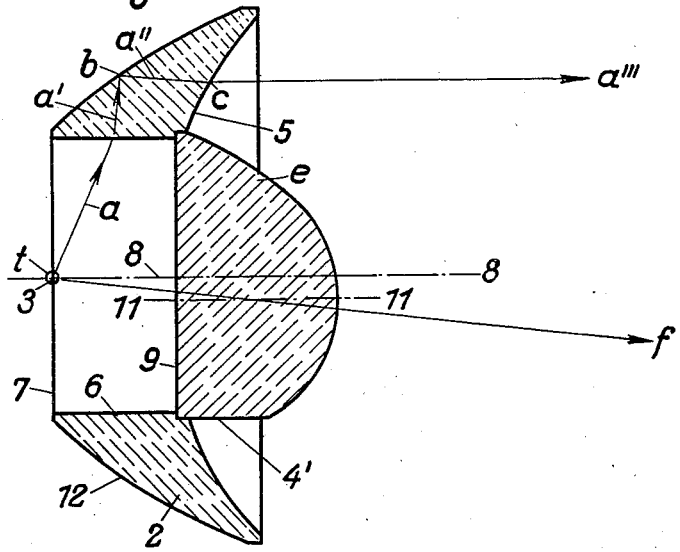

Fig. 1 shows one form of my invention, while Fig. 2 illustrates a slight modification. The same reference numerals indicate the same or corresponding parts.

Referring again to the drawing, the arrangement in question comprises a lens 1 and a catadioptrical ring 2, these two parts being cemented together in simple manner at 4. The rear convex portion 12 of the catadioptrical ring is formed in such manner that the same causes total reflection of a light ray $a$, $a'$, $a''$ and $a'''$ proceeding from the source of light $t$ at 3 without the aid of any kind of metallic mirror or reflector.

The light ray $a$ emanating from light $t$ disposed on the common axis 8—8 of lenses 1 and 2 and substantially in the plane 7 at the rear of lens ring 2 strikes the aperture wall 6 of the latter and is refracted as $a'$ within said lens up to $b$ which is any point in outer reflecting portion 12. From this point the ray is reflected as $a''$ to the frontal portion 5 whence the ray emerges as $a'''$ at a point $c$, the ray now being substantially parallel with axis 8—8. The rays of light which do not enter into wall 6 of lens 2 will pass through rear face 9 of lens 1 through which they will, of course be refracted, according to the particular form of this lens.

In such cases in which the projection of the light cone is desired in a certain direction, for example in the case of railroad signals situated in a curve or along an ascending stretch, this may be accomplished in very simple manner by placing the optical axes of the lens and the catadioptrical portion at an angle to each other so as to correspond with the desired deflection. This is shown in Figure 2, in which the refracting lens member 10 has its axis 11—11 disposed at an angle $\alpha$ to the axis 8—8 of the ring lens 2, so that a ray of light from light source $t$ passing through lens 10, will thus emerge as at $f$, which latter ray is not parallel with axis 8—8, but follows a direction of its own. For this purpose the bearing portion 4' may be correspondingly ground into the catadioptrical portion.

The frontal face 5 of the catadioptrical lens 2 is obviously concave, as may be noted in the drawing, though it may have another form, but it is at the inner edge of face 5 where the wall 6 terminates that the rear portion 9 of lens 1 begins, the latter lens being here shown as plano-convex although it may be of another form which is suitable to co-operate with lens 2. The two lenses thus form a reflecting refracting combination or unit wherein the refracting member is disposed to begin its refractive action at about the level where the light emerges from the reflecting member, this providing for sufficient back to front length of wall 6 for the rays to enter into the lens 2 to an efficient degree. The fact that frontal face 5 is concave sets lens 1 back nearly within the profile outline of lens 2 and makes for a very compact construction of efficient form.

Naturally, should the use thereof be for any reason considered desirable, additional optical arrangements, such as a hollow reflector behind the source of light, an aspherical lens, divisioning of the lens, etc., may also be employed in association with the subject matter of invention.

It will be understood that no limitation is made to the particular form shown in the drawing, which is given merely in diagrammatical form for the sake of better comprehension, and that various modifications may be made within the meaning of the appended claims without departing from the spirit of the invention.

What I claim as new and desire to secure by Letters Patent is:

1. An optical system for signal lamps, comprising in combination, an annular catadioptrical lens formed interiorly with a hollow cylindrical section concentric with the axis of the lens and having both a concave front portion receding rearwardly from the periphery of the lens toward said cylindrical hollow section and an outer rearwardly converging reflecting surface terminating at the rear at a plane perpendicular to said lens axis and serving to solely reflect forward the light rays received from a light source disposed within said hollow cylindrical section, and a collecting lens inserted into the concave front portion of the annular lens and having the peripheral edge thereof seated in an unsymmetrically disposed annular seat portion cut into said concave front portion of said annular lens and into the forward portion of said hollow cylindrical section thereof, while the axis of the collecting lens is inclined at an angle with respect to aforesaid axis, so that the rays of said source of light when surrounded by said annular lens will be caught by the hind rim of the catadioptrical lens within an angle of 180°.

2. An optical system for signal lamps, comprising in combination, an annular catadioptrical lens formed interiorly with a hollow cylindrical section concentric with the axis of the lens and having both a concave front portion receding inwardly and rearwardly toward said cylindrical hollow section and an outer rearwardly converging reflecting surface terminating at the rear at a plane perpendicular to said lens axis and solely serving to reflect forward the light rays received from a light source surrounded by said lens and disposed within said hollow cylindrical section practically at said plane, and a plano-convex collecting lens inserted into the concave front portion of the annular lens and having the plane portion thereof facing rearwardly and seated in an annular seat portion in a plane unsymmetrically disposed with respect to said axis and cut into said concave front portion of said annular lens and into the forward portion of said hollow cylindrical section thereof, while the axis of said plano-convex collecting lens is inclined at an angle with respect to aforesaid axis, so that the rays of said source of light when surrounded by said annular lens will be caught by the hind rim of the catadioptrical lens within an angle of 180°.

PAUL MÜLLER.